United States Patent
Cui

(10) Patent No.: US 12,147,588 B2
(45) Date of Patent: Nov. 19, 2024

(54) CONTROLLED ACCESS TO DATA STORED IN A SECURE PARTITION

(71) Applicant: Alibaba Group Holding Limited, George Town (KY)

(72) Inventor: Xiaoxia Cui, Hangzhou (CN)

(73) Assignee: Alibaba Group Holding Limited (KY)

( * ) Notice: Subject to any disclaimer, the term of this patent is extended or adjusted under 35 U.S.C. 154(b) by 240 days.

(21) Appl. No.: 17/020,572

(22) Filed: Sep. 14, 2020

(65) Prior Publication Data

US 2021/0089684 A1 Mar. 25, 2021

(30) Foreign Application Priority Data

Sep. 20, 2019 (CN) .......................... 201910890559.9

(51) Int. Cl.
*G06F 21/78* (2013.01)
*G06F 9/38* (2018.01)
(Continued)

(52) U.S. Cl.
CPC ............ *G06F 21/78* (2013.01); *G06F 9/3861* (2013.01); *G06F 9/4812* (2013.01); *G06F 21/31* (2013.01);
(Continued)

(58) Field of Classification Search
CPC ...... G06F 21/78; G06F 9/3861; G06F 9/4812; G06F 21/31; G06F 21/575; G06F 21/6218; G06F 2221/2113
(Continued)

(56) References Cited

U.S. PATENT DOCUMENTS 5,651,139 A 7/1997 Cripe
6,769,076 B1 * 7/2004 Moyer ................ G06F 11/3656
714/37
(Continued)

FOREIGN PATENT DOCUMENTS

CN 102184373 9/2011
CN 102486758 6/2012
(Continued)

OTHER PUBLICATIONS

Ren, "Security Challenges for the Public Cloud", Feb. 2012, IEEE, pp. 69-73 (Year: 2012).*
(Continued)

*Primary Examiner* — Piotr Poltorak
*Assistant Examiner* — Gregory A Lane
(74) *Attorney, Agent, or Firm* — Van Pelt, Yi & James LLP

(57) ABSTRACT

Performing controlled access to data stored in a secure partition is described herein, including: associating a predetermined exception with an exception handling program in an operating system; restricting a user program to execution by a normal privilege user; and designating a secure partition and restricting the secure partition to be accessible by a highest privilege user; wherein, when executed in user space corresponding to the normal privilege user, the user program generates the predetermined exception, and wherein the predetermined exception triggers execution of the exception handling program in kernel space, and the exception handling program is configured to read data from the secure partition and deliver the data after processing to the user program.

26 Claims, 5 Drawing Sheets

(51) Int. Cl.
*G06F 9/48* (2006.01)
*G06F 21/31* (2013.01)
*G06F 21/57* (2013.01)
*G06F 21/62* (2013.01)

(52) U.S. Cl.
CPC ........ *G06F 21/575* (2013.01); *G06F 21/6218* (2013.01); *G06F 2221/2113* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 7,165,135 | B1* | 1/2007 | Christie | G06F 21/74 |
| | | | | 726/26 |
| 7,665,143 | B2* | 2/2010 | Havens | G06F 21/57 |
| | | | | 726/2 |
| 2004/0139346 | A1 | 7/2004 | Watt | |
| 2004/0210764 | A1* | 10/2004 | McGrath | G06F 9/4403 |
| | | | | 713/190 |
| 2005/0044319 | A1* | 2/2005 | Olukotun | G06F 9/30032 |
| | | | | 712/E9.034 |
| 2006/0294341 | A1* | 12/2006 | Plondke | G06F 12/1027 |
| | | | | 711/207 |
| 2007/0266374 | A1* | 11/2007 | Grisenthwaite | G06F 9/4812 |
| | | | | 717/127 |
| 2007/0266444 | A1* | 11/2007 | Segal | G06F 21/78 |
| | | | | 726/27 |
| 2007/0300287 | A1 | 12/2007 | Wynne | |
| 2008/0301402 | A1* | 12/2008 | Alapati | G06F 9/4812 |
| | | | | 712/7 |
| 2008/0320333 | A1* | 12/2008 | Watson | G06F 11/3636 |
| | | | | 714/38.11 |
| 2009/0106517 | A1 | 4/2009 | Wang | |
| 2009/0172713 | A1 | 7/2009 | Kim | |
| 2010/0031360 | A1* | 2/2010 | Seshadri | G06F 21/74 |
| | | | | 726/28 |
| 2012/0079458 | A1* | 3/2012 | Williams | G06F 11/3648 |
| | | | | 717/124 |
| 2014/0068704 | A1* | 3/2014 | Grewal | G06F 21/85 |
| | | | | 726/4 |
| 2016/0092678 | A1 | 3/2016 | Probert | |
| 2017/0249178 | A1 | 8/2017 | Tsirkin | |
| 2018/0121665 | A1* | 5/2018 | Anderson | G06F 21/6209 |
| 2021/0089684 | A1* | 3/2021 | Cui | G06F 21/575 |
| 2021/0342092 | A1* | 11/2021 | Wu | G06F 3/0673 |

FOREIGN PATENT DOCUMENTS

| | | |
|---|---|---|
| CN | 102592083 | 7/2012 |
| CN | 109840410 | 6/2019 |
| JP | 2009009232 | 1/2009 |
| WO | 2019148948 | 8/2019 |

OTHER PUBLICATIONS

Costan, "Intel SGX Explained", 2016, MIT, pp. 1-118 (Year: 2016).*

Scarfone et al., Guide to Storage Encryption Technologies for End User Devices, NIST Special Publication, Nov. 2007.

* cited by examiner

CONTROLLED ACCESS TO DATA STORED IN A SECURE PARTITION

CROSS REFERENCE TO OTHER APPLICATIONS

This application claims priority to People's Republic of China Patent Application No. 201910890559.9 entitled A METHOD, SYSTEM AND COMPUTER-READABLE MEDIUM filed Sep. 20, 2019 which is incorporated herein by reference for all purposes

FIELD OF THE INVENTION

The present invention relates to restricting access to designated data stored on a system. Specifically, the present invention relates to restricting access to data designated to be stored in a secure partition of a system.

BACKGROUND OF THE INVENTION

In the fragmented application field of the Internet of Things, there is a class of devices which are characterized by low cost, low power consumption, and few resources. They are large in number, and their applications are wide-ranging. They are mainly concentrated among sensors, industrial control products, consumer electronics, and Internet of Things products. Their large quantities mean very stringent cost requirements. Therefore, the final products often do not have basic security features. As a direct result, the manufacturers' private data or product function authentication information may very easily be leaked to or accessed by unauthorized users during product secondary development processes or during the production process. Persons seeking to illicitly acquire benefits may directly read useful data information via the debugging interface, or they may directly read such data information through a self-developed user code. After analyzing it, they can extract valuable or sensitive information. By using this valuable or sensitive information, persons seeking to illicitly acquire benefits may quickly replicate similar devices having the same features. Some replicated devices may use this information to directly communicate with cloud servers. As a result, the illicit users may conceal their own true identities and use cloud services via their unauthorized devices without paying. Some devices have an automatic networking feature. Because of the need for real-time performance and ease of use, the networking protocols are not very secure when it comes to identity recognition, and some even lack identity recognition features. As a result, it becomes possible to freely join a local network with just a device having the networking information and then to use a device on another network node to acquire more information of value, which could leave devices vulnerable to theft of the manufacturers' private data or product function authentication information.

An investigation into the fundamental cause of this problem reveals that this class of devices often sacrifices security needs in the pursuit of low costs. However, to raise the security protections of this type of device while constrained by cost pressures remains a technical difficulty for persons skilled in the art.

BRIEF DESCRIPTION OF THE DRAWINGS

Various embodiments of the invention are disclosed in the following detailed description and the accompanying drawings.

Reference to the drawings below that describe embodiments of the present invention will further clarify the objectives, features, and advantages, whether described above or otherwise, of the present invention. The drawings:

FIG. 3 is a flow diagram showing an embodiment of a process for performing a controlled access to a secure partition.

DETAILED DESCRIPTION

Figure 1:
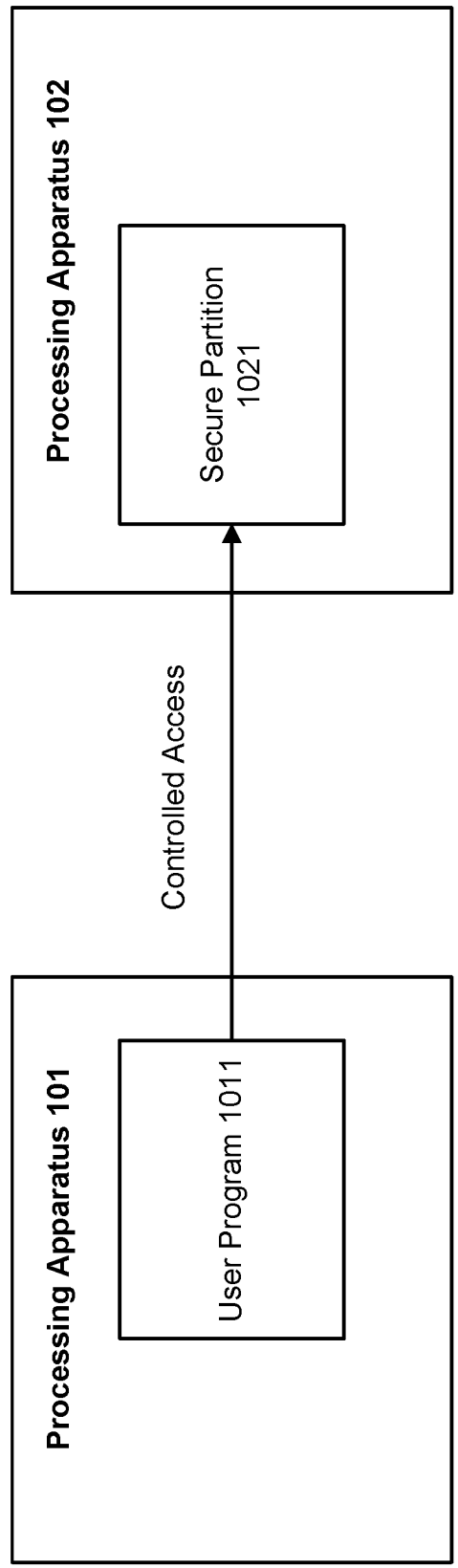
FIG. 1 is a diagram showing an application scenario of one processing apparatus interacting with another processing apparatus.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present invention is described below on the basis of embodiments, but the present invention is not limited to these embodiments. In the following description of the details of the present invention, some specific details are described exhaustively. A person skilled in the art would be able to completely understand the present invention without the description of these details. To avoid confusing the substance of the present invention, there is no detailed recitation of well-known methods and processes. In addition, the drawings are not necessarily drawn according to proportion.

Embodiments of performing a controlled access to data in a secure partition are described herein. A predetermined exception is received from a user program. The user program is caused by a normal privilege user to be executed by a processor. In response to receipt of the predetermined exception, an exception handling program corresponding to the predetermined exception is executed by the processor to access data from a secure partition. The exception handling program is configured to output the accessed data from the secure partition.

As will be described in further detail below, the secure partition is configured to store sensitive, secretive, and/or proprietary information (e.g., that is associated with the manufacturer that had manufactured the processing apparatus on which the secure partition is stored) and usually, users of the normal privilege type/permission level are not permitted to read, write, or otherwise access the secure partition. However, in various embodiments, a secure partition that is associated with a corresponding exception handling program can be generated by a user program that is executed by a processor in response to an instruction by a normal privilege user. The exception handling program corresponding to the secure partition can then be executed to directly read raw data from the secure partition. Before the exception handling program returns the data from the secure partition back to the normal privilege user, the exception handling program processes the raw data by, for example, encrypting, obfuscating, and/or removing at least a portion of the data so that any sensitive, secretive, and/or proprietary portions of the data from the secure partition will not be readily available to the normal privilege user. Hence, the normal privilege user's access to data stored at the secure partition is not unrestricted by rather controlled.

For the sake of clarity given the different meanings of the terms "exception" and "interrupt" in different CPU architectures (e.g., x86, ARM, RISC V, PowerPC, etc.), in various embodiments, "exception" refers to a software exception that occurs in a program while it is running, and, in various embodiments, "interrupt" is defined as a hardware-related interrupt. In the case of an operating system, both "exceptions" and "interrupts" begin handling through a unified entry: "exception/interrupt vector." In various embodiments, the "exception/interrupt vector" includes all types of exceptions and interrupts the handling program addresses corresponding to each exception or interrupt type, and corresponding control process flows. When an exception or interrupt occurs, the processor goes to the processing program address corresponding to the occurred type of exception or interrupt and begins execution. Exceptions may be divided between "recoverable" and "unrecoverable." Specifically, an exception is a "recoverable" exception if a user program that is being executed triggers the generation of the exception, and then, after the exception has entered and undergone handling in an exception handling program, the processing context of the user program can be recovered, i.e., recovered to the current instruction that generated the exception or to the next instruction. In contrast, all interrupts are unrecoverable.

A "processing apparatus" described herein may refer to any of various types of computer systems, including but not limited to, desktop computers, servers, notebooks, and work stations. A "processing apparatus" may also refer to any of various types of embedded products, including but not limited to cellular telephones, voice over Internet protocol devices, digital cameras, personal digital assistants (PDAs), hand-held PCs, network computers (NetPCs), set-top boxes, network hubs, and wide area network (WAN) switches. A control system realized on the basis of software and hardware is deployed on the processing apparatus. This control system may be partially integrated into the processing apparatus and may be partially deployed in the processing apparatus through installation. This control system may be called different names in different types of processing apparatuses. However, for the sake of descriptive convenience, the control system will be referred to as "operating system" in the present document.

In various embodiments, the default management mode of this operating system is multi-user. In various embodiments, there are at least two types of users/privilege levels of the operating system. In some embodiments, a first (privilege level) type of users is sometimes referred to as "normal privilege users" and the second (privilege level) type of users is sometimes referred to as "highest privilege users." Each privilege type of user of the operating system is assigned a different set of permissions (e.g., read, write, and read and write) with respect to different functions of a device. For example, "normal privilege users" are users that are developers that perform secondary development after a processing apparatus has been delivered to a customer, such as application developers. For example, "highest privilege users" are users that are associated with the manufacturer of the processing apparatus or users that have been granted access to sensitive, secretive, and/or proprietary data associated with the manufacturer. What type of permissions that may be assigned to each privilege type of users (e.g., normal privilege users and highest privilege users), in some embodiments, are described in further detail below.

In various embodiments, the operating system under multi-user management mode partitions the address space of memory in terms of software logic into a "kernel space" and at least one "user space." For example, the Linux operating system treats the highest 1G bytes (from virtual address 0xC0000000 to 0xFFFFFFFF) as kernel space and treats lower 3G bytes (from 0x00000000 to 0xBFFFFFFF) as user space. Operating system code and data are put in the kernel space, and user-created user program code and data are put in a user space. Tasks can be performed in the kernel space, and they can also be performed in a user space. The operating modes of the processor are thus divided into the kernel mode and a user mode. The processor has more permissions in the kernel mode than it does in a user mode. For example, when operating in the kernel mode, the processor can access all data and instructions in the kernel space and a user space. Moreover, the processor can also access peripheral devices, such as hard drives and network cards, through device drivers. For example, when executing in a user mode, the processor can only access the data and instructions in its own user space. However, when operating in a user space, the processor can switch from user space to kernel space, i.e., from the user mode to the kernel mode, through system calls, exceptions, and peripheral device interrupts.

FIG. 1 is a diagram showing an application scenario of one processing apparatus interacting with another processing apparatus. In the example of FIG. 1, processing apparatus 101 is interacting with processing apparatus 102. As shown in FIG. 1, processing apparatus 102 includes secure partition 1021. Secure partition 1021 represents any partition within processing apparatus 102. Secure partition 1021 may be designated by physical addresses or by virtual addresses, for example. Secure partition 1021 may be secretive, proprietary, and/or sensitive data, e.g., some important code and data information. For example, at least some content included in secure partition 1021 relates to a manufacturer of processing apparatus 102. Specifically, device information, IDs, keys, and other information from when the product was manufactured may be written into secure partition 1021. Processing apparatus 101 includes user program 1011. As will be described in further detail below, user program 1011 (e.g., such as an application) is configured to read data from secure partition 1021 in a controlled manner. For example, reading data from secure partition 1021 in a controlled manner may include the operating system of processing apparatus 102 providing a processed version of data that has been read from secure partition 1021, where the processed version of the data has already removed any sensitive data or other data that is not desired to be shared with user programs. As a result, user program 1011 can only obtain data processed from protected data so as to ensure data security in secure partition 1021.

Processing apparatus 101 and processing apparatus 102 may be any apparatuses, including but not limited to, flash chips, processors (CPUs), digital processors (DSPs), systems on a chip, processing units manufactured for various specialized purposes, and various electronic products formed from the above. If processing apparatus 101 is, for example, flash memory, and processing apparatus 102 is a computer, processing apparatus 101 and processing apparatus 102 may be regarded overall as one computer system. When both processing apparatus 101 and processing apparatus 102 are, for example, computers, then processing apparatus 101 may remotely execute a user program or may copy a user program to processing apparatus 102 for execution there.

Figure 2:
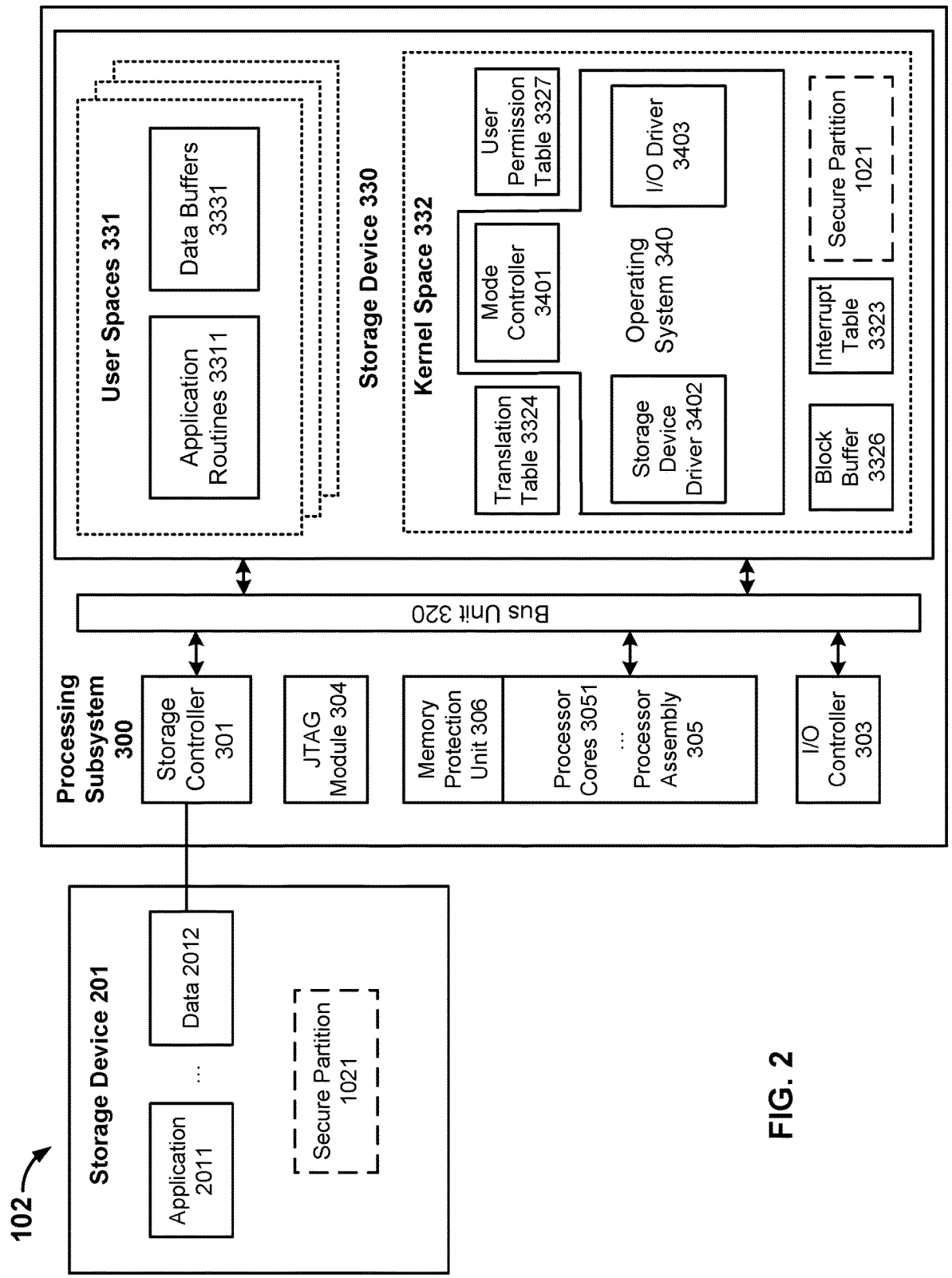
FIG. 2 is a structural diagram showing an example of a processing apparatus.

FIG. 2 is a structural diagram showing an example of a processing apparatus. In particular, the example processing apparatus of FIG. 2 may be used to implement processing apparatus 102 of FIG. 1.

Referring to FIG. 2, the example processing apparatus includes storage device 201 and processing subsystem 300, which are linked together by bus unit 320. Processing subsystem 300 includes storage controller 301 corresponding to storage device 201. Processing subsystem 300 controls operations directed at storage device 201 through storage controller 301. For example, processing subsystem 300 may engage in data exchanges with storage device 201 in the form of data blocks. In this example, storage controller 301 and storage device 201 are represented as independent devices. However, in some situations, the functions of storage controller 301 and storage device 201 are integrated in one device.

Processing subsystem 300 executes multiple application routines 3311 to complete the execution of multiple tasks. Each application routine 3311 may be any of many types of application programs, including but not limited to, word processing programs, electronic form editors, CAD/CAM software, website browsers, audio/visual recording and/or playing software, and photograph editors. As a management scheduling center for various tasks, operating system 340, being a part of processing subsystem 300, is executed by processor assembly 305. Operating system 340 can provide an operating environment to support the execution of multiple application routines 3311. Thus, operating system 340 executes one or more device drivers. With the device drivers, the operating environment of operating system 340 is expanded to provide support for all kinds of devices. For example, storage device driver 3402 supports storage controller 301 in communicating with external storage device 201. I/O driver 3403 supports I/O controller 303 in communicating with external I/O controls.

In each embodiment, processing subsystem 300 may contain processor assembly 305. Processor assembly 305 may contain one or more processor cores 3051. The plurality of processor cores may, for example, include high-power cores, which are faster and more complex, and low-power cores, which are slower and less complex. Some instances of storage devices 330, which are more efficient than the storage device 201, are partitioned in processing subsystem 300, and are used for the intermediate storage and caching required by the various kinds of processing provided by processor assembly 305.

In various embodiments, storage device 330 is partitioned into kernel space 332 and one or more user spaces 331 in accordance with storage position address ranges. In a multi-user management operating environment, one or more user spaces 331 belong to the run spaces of one or more respective user programs, and kernel space 332 belongs to the run space of the operating system and system programs. In kernel space 332, it is possible, for example, to store operating system 340, page table (not shown), page buffer (not shown), interrupt table (IDT) 3323, translation table 3324, block buffer 3326, and user permission table 3327, and entries associated with the running of the operating system. A page table relates the page virtual addresses of application 2011 (executing on storage device 201) to the physical addresses used for pages in storage device 330. Block buffer 3326 is configured to cache data in storage device 201 in the form of blocks and can provide page data that is searched in the form of pages. Translation table 3324 is configured to relate a page virtual address to identifiers of one or more data blocks in storage device 201 that can include the content of that page. User permission table 3327 is a relational table for multiple users and permissions.

In various embodiments, processor assembly 305 can be linked to a memory protection unit (MPU) 306. Processor assembly 305 is configured to access storage device 330 through memory protection unit 306. Memory protection unit 306 is realized with hardware logic and manages storage space by using regions. The regions are attributes associated with storage space. Operating system 340 may then allocate more attributes, such as access permissions and caches, to the regions. Therefore, in some embodiments, the aforementioned partitioning of kernel space 332 and user space(s) 331 may be achieved using memory protection unit 306 and operating system 340.

Each user space of one or more user spaces 331 can store corresponding instances of application routine 3311 and data buffer 3331. Application routine 3311 is a copy of at least a part of application 2011 stored on storage device 201. Data buffer 3331 is a copy of at least a part of data 2012 stored on storage device 201. Although, in some embodiments, storage device driver 3402 and I/O driver 3403 may be provided by a vendor other than the vendor of operating system 340, these drivers may be regarded on the basis of their interactions as components of operating system 340, as shown in the drawing. For example, operating system 340 may be a current, generally applicable version of a Windows™ operating system, a UNIX operating system, a Linux operating system, an Android operating system, or a RealTime OS operating system.

Figure 3:
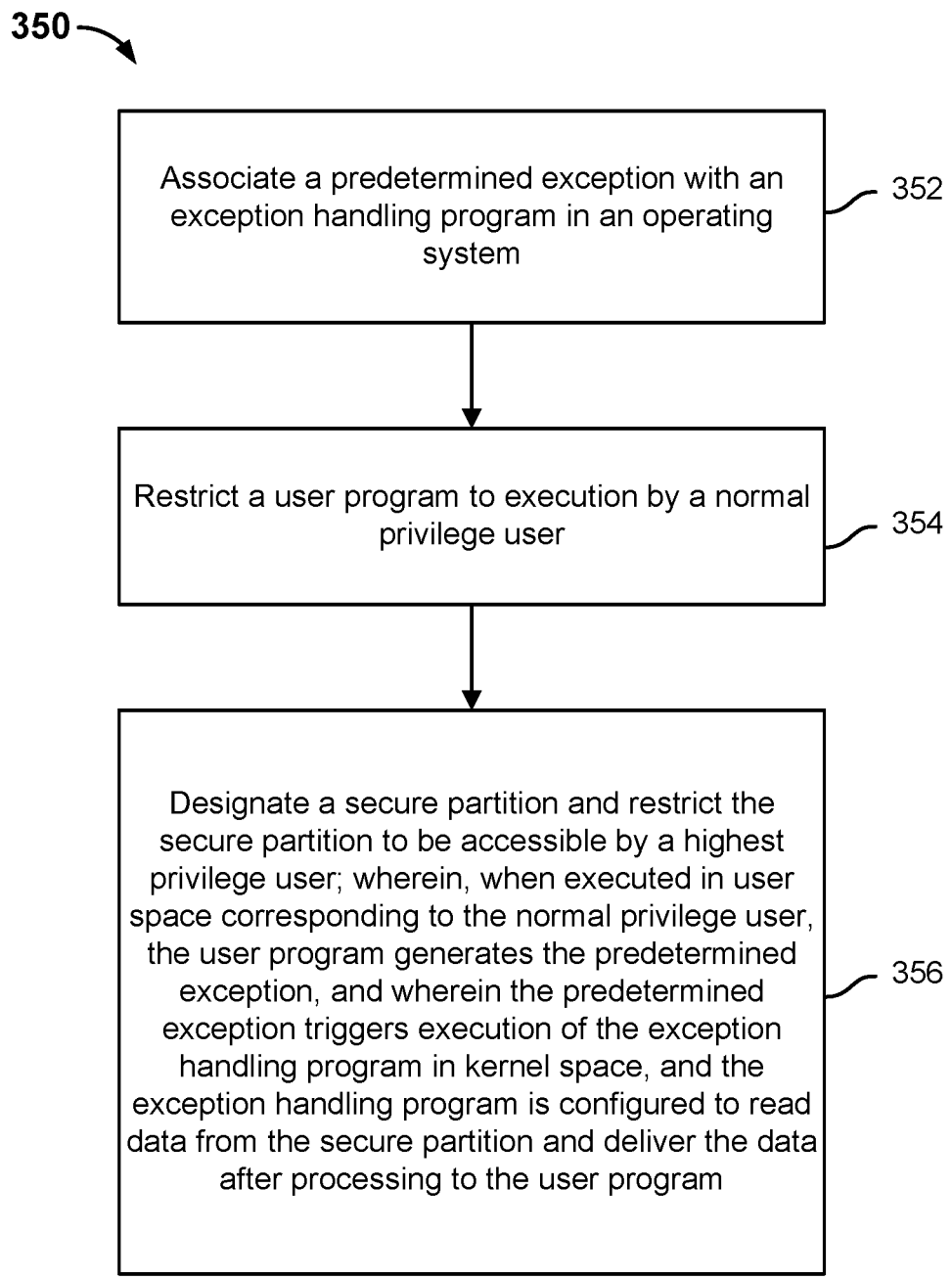
FIG. 3 presents an interaction diagram of a normal user, a secure user program, an operating system, and an exception handling program.

One or more processor cores 3051 of processing assembly 305 may have the same or different instruction sets. With an instruction set, any processor core 3051 of processing assembly 305 can contain any instruction in application routine 3311 and operating system 340, which it can decode and execute. As shown in the diagram of FIG. 3, operating system 340 may also include mode controller 3401. Mode controller 3401 is configured to make judgments on the execution of the multiple processor cores. For example, in some embodiments, mode controller 3401 may monitor the level of demand for processing resources and may dynamically set processor assembly 305 to one of multiple modes based on the demand level. For example, when the demand for processing resources drops to a level where they may be provided solely by low-power cores, mode controller 3401 can set processor assembly 305 to a mode where instructions are executed by low-power cores, but not by high-power cores. For example, when the demand for processing resources rises close to the upper limit of what can be provided by low-power cores, mode controller 3401 can set processor assembly 305 to a mode where instructions are executed collaboratively by a combination of low-power cores and high-power cores.

The modules and sub-modules described above can be implemented as software components executing on one or more processors, as hardware such as programmable logic devices, and/or as Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Processing subsystem 300 also includes JTAG module 304. JTAG (Joint Test Action Group) is an international standard test protocol (IEEE 1149.1 compatible), which is mainly used for circuit testing within a chip. For descriptive convenience, all the required hardware and software units used for supporting JTAG testing that are included in subsystem 300 will be collectively referred to as JTAG module 304. Test signals can be sent to the JTAG module 304 to drive all the relevant internal circuits, and the test results can be determined according to the output signals.

Storage device 330 and storage device 201 may be realized on the basis of any of a wide range of many kinds of information storage technology. Each of storage devices 330 and 201 includes, but is not limited to read-only memory (ROM), random access memory (RAM), dynamic RAM (DRAM), double data rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), two-way memory, phase-change or ferroelectric memory, silicon-oxide-nitride-oxide-silicon (SONOS) memory, magnetic or optical cards, one or more single ferromagnetic magnetic disk drives, or multiple storage devices organized into one or more arrays (e.g., organized into a redundant array of independent disks or multiple ferromagnetic magnetic disk drives in a RAID array). Please note that, although each of these storage devices is presented as a single storage device, it may include multiple storage components based on different storage technologies. For example, storage device 330 may represent a combination of an optical disk driver or flash card reader that can store and output programs and/or data in a particular form of machine readable medium, a ferromagnetic disk driver that locally stores programs and/or data for a relatively long period of time, and one or more volatile solid-state memory devices (e.g., SRAM or DRAM) that permit relatively rapid access to programs and/or data. Or each storage device of storage devices 330 or 201 may be based on the same storage technology, but be composed of multiple storage components that have specialized uses and are individually maintained (e.g., some DRAM devices that serve as a main memory, and other DRAM devices that serve as unique framebuffers for graphics controllers).

A typical selection based on the positions and uses of storage device 330 and storage device 201 is as follows: storage device 330 makes use of volatile storage technology that provides uninterrupted power. Storage device 330 may need to provide even more power, but the relative speed will be higher and the processing, faster. For example, storage device 330 uses one or more of random-access memory (RAM), dynamic RAM (DRAM), dual data rate DRAM (DDRAM), synchronous DRAM (SDRAM), and static RAM (SRAM), while the storage device 201 makes use of non-volatile storage technology, such as flash memory.

To ensure data security in secure partition 1021, secure partition 1021 may be set within an area in kernel space 332 of storage device 330 and storage device 330 is required to store secure partition 1021 in a non-volatile memory to ensure that the data in that area will not be lost following an operating system power outage. For example, secure partition 1021 may be set up in an area of ROM. In such a situation, data security in secure partition 1021 can be increased because kernel space data is basically "invisible" to a user program. In addition, it is also possible to set up secure partition 1021 in storage device 201, and, to prevent the user program from reading data in the secure partition 1021, secure partition 1021 can be set up so that it can be executed a processor in response to an instruction only by a highest privilege type of user. However, it is still possible in such a situation for a normal privilege type of user to raise his or her privilege through a system call security vulnerability in order to access the secure partition 1021 in a kernel space.

Therefore, in various embodiments, a processing apparatus also provides a security access management module (not shown) to further strengthen access control over secure partition 1021.

A security access management module, which may be executed by operating system 340 in the kernel space of storage device 330, sets the operating permission for secure partition 1021 and strictly manages the execution stream from the processor and access of the partition by peripheral device direct memory access (DMA). In various embodiments, the security access management module has logic processing functions relating to three aspects: 1) for designating the position and size of secure partition 1021; 2) setting the access permission for secure partition 1021 so that only highest privilege users can directly read it while other users (e.g., normal privilege users) do not have permission to directly read from secure partition 1021; and 3) providing an exception handling program, which is used to extract protected data from secure partition 1021 when a predetermined exception occurs and then to export the data after processing it. Example techniques for processing raw data read from secure partition 1021 may include exporting the data after encrypting it with a key, hiding critical configuration information in the device information, removing or obfuscating sensitive content within the data before exporting the data, and so on. Regardless of how the data from secure partition 1021 is processed, the result is that processed data is not in need of further secrecy (e.g., because it has either been encrypted for use by legitimate parties that know how to correctly decrypt the encrypted data and/or it is stripped of sensitive content) and the requesting user may use it without concern.

In various embodiments, the operating permission that is needed by a user to operate a user program in storage device 330 is the permission associated with the group of normal privilege users. Put another way, a user program can be started in storage device 330 by users of the normal privilege type. Generally, because the developers of user programs (e.g., the developers that perform secondary development after products are delivered to customers) are restricted to having only the normal privilege level and do not have the highest privilege level, the user programs they develop are by default executed by a processor in response to instructions by normal privilege users. In some cases, it can be mandatory to restrict user programs so that they can be executed by a processor in response to instructions by normal privilege users only.

The security access management module is configured to set an operating permission for access to (e.g., the ability to directly read from) secure partition 1021. Therefore, in various embodiments, access to the security access management module itself is limited to highest privilege users. In addition, as an interface function provided to the user program, the exception handling program generally is not set to have an independent permission. While a user program is enabled to use the exception handling program only during exception handling, in various embodiments, the operating permission for the file containing the exception handling program is restricted to execution by a processor in response to instructions by highest privilege users only.

In addition, to prevent user program developers, which are normal privilege users, from accessing secure partition 1021 through a system invocation using a system service program, in various embodiments, most system service programs may be set so that they can be used by highest privilege users only. A system service program is a group of sub-routines used to implement various system functions. With regard to a general operating system, a system service program may include, for example, but is not limited to: device management, file management, process management, and memory management. However, as will be described below, in various embodiments, normal privilege users and therefore, a user program that is executed by a processor in response to an instruction by a normal privilege user, is to be granted permission to cause a processor to execute one or more specific types of system service programs that once called by the user program, are to cause the user program to generate a "predetermined exception," which will be described in further detail below.

With regard to the permissions mentioned above, the permission-setting command (e.g., chmod in Linux or Unix) provided by operating system 340 may be used to configure the setting, or a relevant interface may be called in the program to configure the setting. Example permissions as described above with respect to each entity by different groups/types/permission level of users are summarized in Table 1, below.

TABLE 1

| Category | Normal privilege user | Highest privilege user |
| --- | --- | --- |
| User program | May execute | May not execute |
| Secure partition | May not read, write, or access | May read, write, and access |
| Secure access | May not execute | May execute |

TABLE 1-continued

| Category | Normal privilege user | Highest privilege user |
| --- | --- | --- |
| management module | | |
| Exception handling program | May not execute | May execute |
| (Most) System service programs | May not execute | May execute |

In some embodiments, secure partition 1021 and the security access management module are both located in processing apparatus 102, while a user program may be located in another processing apparatus (e.g., such as processing apparatus 101 of FIG. 1) or the user program may be copied to processing apparatus 102 and run there.

Based on the example permissions described above in Table 1, the only access to a secure partition by any user program is via controlled access, as will be described in further detail below. Specifically, how access to a secure partition is controlled, in accordance with at least some embodiments, is as described below:

First, a user program cannot directly access a secure partition. Recall that a user program is restricted so that only normal privilege users can start it. Therefore, when the user program requests to directly read data in the secure partition after being started by a normal privilege user, the processor generates an exception because the secure partition is restricted so that only highest privilege users can read directly from it. As a result, the user program will fail to directly read data from the secure partition.

Second, a user program cannot obtain data from a secure partition by raising the user program's operating permission with a system call. A system service program is set so that only highest privilege users can execute it. So, only a user program that is executed by a highest privilege user can invoke a system service program. However, as mentioned above, user programs are subject to the requirement that only normal privilege users can execute it. Therefore, after a normal privilege user starts the user program, the processor will generate an exception when code for calling the system service program to raise the user program's operating permission is executed.

Third, to enable a user program to access data in a secure partition, in various embodiments, a "predetermined exception" is needed to be generated in the user program and then a corresponding exception handling corresponding to the predetermined exception is to be executed. In various embodiments, the "predetermined exception" refers to a particular software exception that is predetermined as the exception that is associated with a particular type of exception handling that results in reading, processing, and exporting data from the secure partition. The exception handling program of the security access management module is configured to access data in the secure partition and send back a processed version of the data that is read from the secure partition. The exception handling can be executed successfully because it is executed in the kernel space. With this approach, the user program is only able to obtain data after the raw data read from the secure partition has been processed. Thus, data security in the secure partition can be guaranteed.

In some other embodiments, a special user may be established in an operating system. Use by this special user is not unrestricted. The permission for the secure partition is designated so that only the special user can read and access it. Other permission settings remain unchanged. Thus, it is still possible to obtain processed data based on the operations described above.

The example of an exception type supported by an ARM system architecture processor is used below to provide a detailed example explanation of a predetermined exception that is generated by a user program in accordance with various embodiments. Other system architectures, such as X86, MIPS, and PowerPC, may differ slightly, but the basic principles should be universal.

Table 2, below, is used to present at least part of the data information of an exception/interrupt vector.

TABLE 2

| Exception/interrupt type | Exception/interrupt mode | Vector address | Priority level (1 is the highest) |
|---|---|---|---|
| Reset | Management mode | 0x00000000 | 1 |
| Undefined instruction | Undefined mode | 0x00000004 | 6 |
| Software interrupt (SWI) | Management mode | 0x00000008 | 6 |
| Prefetch abort | Abort mode | 0x0000000C | 5 |
| Data abort | Abort mode | 0x00000010 | 2 |
| Retain | | 0x00000014 | Retain |
| External interrupt request (IRQ) | IRQ mode | 0x00000018 | 4 |
| Fast interrupt request (IRQ) | FIQ mode | 0x0000001C | 3 |

Generally, the operating system code contains an exception/interrupt vector, like the one shown above in Table 2. Table 2 specifies the entry address (corresponding to the "Vector address" column in Table 2) for the processing program corresponding to each exception or interrupt type (corresponding to the exception or interrupt type in Table 2). The entry address is the base address of the exception/interrupt vector with the offset added. After a corresponding exception or interrupt type occurs, the system goes to the entry address that corresponds to the occurred exception/interrupt type and executes the instructions stored at that address. Moreover, the processor enters the corresponding exception/interrupt mode (corresponding to the "Exception/interrupt mode" column in Table 2). Thus, it is necessary for the corresponding exception handling program corresponding to each exception/interrupt type to be copied in advance or written as firmware at the corresponding entry address.

Although the user program theoretically can generate any exception/interrupt type, in various embodiments, the user program is configured to generate an exception/interrupt type that is controllable and recoverable. "Controllable" means that the exception can be generated with the necessary method, and "recoverable" means that the processing context prior to the occurrence of the interrupt may be recovered after the exception/interrupt handling program has been executed. In various embodiments, a (e.g., controllable and recoverable) exception/interrupt type is predetermined as the "predetermined exception" that is to trigger the exception handling program for reading, processing, and exporting data from the secure partition. For example, testing has shown that the exception/interrupt type of "data abort" may be selected as the predetermined exception to be generated by a user program to trigger the corresponding exception program as described herein. A "data abort" exception/interrupt type indicates that the address of the instruction to be accessed by the processor does not exist or that the address is inaccessible by the current instruction.

It is possible in the user program to generate predetermined exceptions by calling various system service programs that perform memory or file operations. For example, a data abort exception is generated when a system service program in memory is used to perform a write operation on a read-only storage area. To give another example, if a storage area (e.g., the secure partition) can be read by the highest privilege user only, a data abort exception will be generated when a normal privilege user attempts to read from that storage area (e.g., the secure partition). However, it should be noted that while normal privilege users typically do not have permission to cause the execution of most system service programs, in various embodiments, normal privilege users are to be given permission to cause the execution of the particular system service program(s) that will cause the user program to generate the exception that is set as the predetermined exception. By allowing normal privilege users to have permission to execute certain enumerated system service program(s), a user program that is executed by a normal privilege user is able to generate a predetermined exception during the execution of those system service program(s). For example, if the "data abort" exception/interrupt type has been set as the predetermined exception, then normal privilege users are set to have permission to call/execute a system service program in memory that is configured to perform a write or read operation. As such, when the user program, started by a normal privilege user, calls the system service program in memory that is configured to perform a write or read operation to the secure partition, from which the normal privilege user does not have permission to perform a write, the user program is configured to generate the predetermined "data abort" exception.

In various embodiments, the predetermined exception is also associated with a corresponding exception handling program that, when executed, is configured to read data from the secure partition, process (e.g., encrypt, obfuscate, and/or remove sensitive portions) the read raw data, and then export the read data such that it can be accessible to the normal privilege user that had requested the write or read operation to the secure partition. That is, the predetermined exception and the data and code associated with the corresponding exception handling program are added in the exception handling vector, and the exception handling program code is copied to the vector address corresponding to the exception/interrupt vector after the operating system starts. As for embedded systems, the exception handling program code can be written as firmware into the processor ROM.

Through the operations described above, the corresponding exception handling program can be triggered when the predetermined exception occurs.

FIG. 3 is a flow diagram showing an embodiment of a process for performing a controlled access to a secure partition. In some embodiments, process 350 is implemented by an operating system such as operating system 340 as part of the example processing apparatus that is shown in FIG. 2.

At 352, a predetermined exception is associated with an exception handling program in an operating system.

At 354, a user program is restricted to execution by a normal privilege user.

At 356, a secure partition is designated and restricted to be accessible by a highest privilege user is permitted to read the secure partition, wherein, when executed in user space corresponding to the normal privilege user, the user program generates the predetermined exception, and wherein the predetermined exception triggers execution of the exception handling program in kernel space, and the exception handling program is configured to read data from the secure partition and deliver the data after process to the user program.

As mentioned above, the secure partition stored on the processing apparatus may include sensitive, secret, or proprietary information. As such, the secure partition is configured so that it is readable, writeable, and accessible to only users of a predetermined type. In some embodiments, where there are at least two types of users, normal privilege users and highest privilege users, only highest privilege users can read from, write to, and access from the secure partition while other types of users, including the normal privilege users, cannot read from, write to, or access the secure partition.

In various embodiments, a user program is executed in a corresponding user space that also stores data and computer code pertaining to one or more application routines.

In various embodiments, given that user programs are configured such that only normal privilege users can instruct a processor to execute them, any user program that is executed is executed by a normal privilege user. Furthermore, the executed user program is also associated with the normal privilege level of the normal privilege user that had executed it. In various embodiments, because a normal privilege user cannot directly access data stored in the secure partition by using an executed user program to access the secure partition, the normal privilege user can request the executed user program to perform a particular operation that will cause the user program to generate a predetermined exception. As mentioned above, the predetermined exception is generated by the user program when the user program calls a particular system service program, for which the normal privilege user has been granted permission to call, to perform a particular operation. In a specific example, if the "data abort" exception/interrupt type has been preset as the predetermined exception, then a user program invocation of a system service program to perform a write or read operation to the secure partition will cause the user program to generate the predetermined "data abort" exception, because only highest privilege users can access the secure partition and not a user program that has been executed by a normal privilege user.

In various embodiments, the exception handling program that corresponds to the predetermined exception, when executed, is configured to provide the normal privilege user that had executed the user program controlled access to the secure partition. The computer code corresponding to the exception handling program that corresponds to the predetermined exception is stored at the vector address corresponding to the predetermined exception in the exception/interrupt vector (e.g., an example of which is shown in Table 2, above). As such, once the predetermined exception that is generated by the user program is received by the operating system, the operating system is configured to access the exception/interrupt vector and determine the vector address at which the computer code for the exception handling program corresponding to the predetermined exception is stored. The computer code for the exception handling program corresponding to the predetermined exception is then read from the storage medium and executed. The executed computer code for the exception handling program corresponding to the predetermined exception is configured to read raw data from the secure partition and then process the raw data in accordance with one or more configured techniques. For example, because the raw data from the secure partition is presumed to include sensitive, secretive, and/or protective information, the exception handling program corresponding to the predetermined exception is configured to process the raw data by encrypting it in a manner that authorized users (e.g., with the appropriate decryption key) can decrypt the encrypted data, obfuscate the sensitive portions of the raw data, remove the sensitive portions of the raw data, or otherwise process the raw data to make at least the sensitive portions of the raw data not readably readable to a normal privilege user. After processing the raw data read from the secure partition, the exception handling program corresponding to the predetermined exception is also configured to export the processed data. In some embodiments, the exception handling program corresponding to the predetermined exception exports the processed data by including it in a data file that is granted access to the normal privilege user that had executed the user program that had generated the predetermined exception. In some embodiments, the exception handling program corresponding to the predetermined exception exports the processed data by sending it back to the operating system, which in turn sends it back to the user program. The user program can then output the processed data from the secure partition to the normal privilege user. However the normal privilege user receives the exported processed data that was read from the secure partition by the exception handling program corresponding to the predetermined exception, and various embodiments described herein enable a normal privilege user that does not have direct access to the secure partition to be able to access a protected version of data read from the secure partition. Therefore, the access to the raw data from the secure partition can be controlled in a manner that ensures the security of such data.

Figure 4:
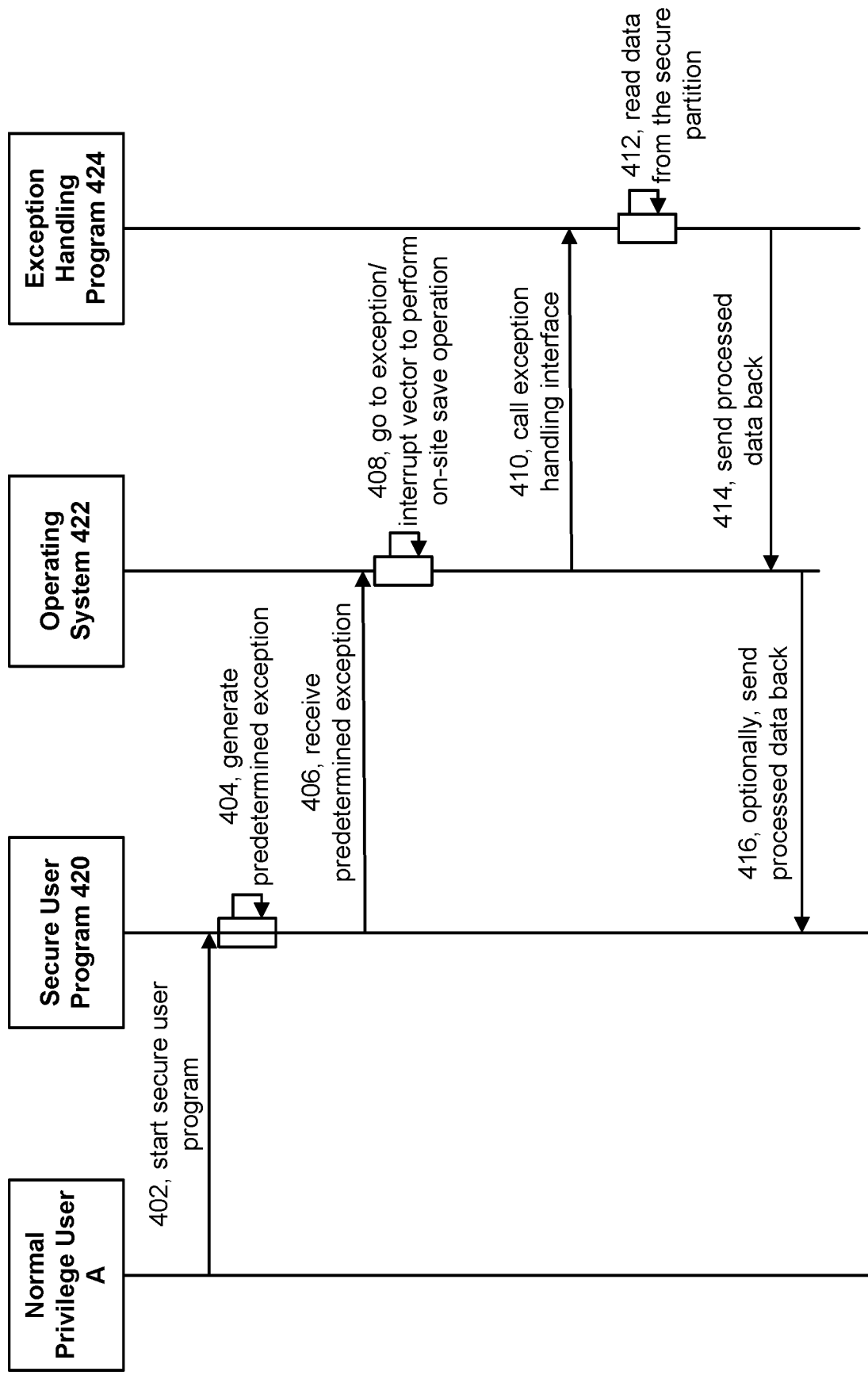
FIG. 4 is a sequence diagram that shows an example process in which a user program can perform a controlled access to data stored at a secure partition.

FIG. 4 is a sequence diagram that shows an example process in which a user program can perform a controlled access to data stored at a secure partition.

In FIG. 4, secure user program 420 refers to the user program that generates the predetermined exception and thereby triggers the exception handling program that corresponds to the predetermined exception in the security management access module as described above. Most of the control process for the exception or interrupt has already been implemented in the operating system. Therefore, the operating system is presented as an independent entity in the diagram of FIG. 4.

At 402, secure user program 420 is started by normal privilege user A in a corresponding user space. As mentioned above, secure user program 420 is restricted by the secure access management module so that it can be executed only by a normal privilege user (and not by another type of user, such as a highest privilege user).

At 404, a predetermined exception is generated by secure user program 420. As mentioned above, secure user program 420 can generate a predetermined exception in response to calling a system service program, for which secure user program 420/normal privilege user has permission to invoke, to perform a certain operation. For example, the system service program is invoked by the user program to perform a write or read operation to the secure partition, which will cause the user program to generate the predetermined (e.g., "data abort") exception, because only highest privilege users can access the secure partition and not a user program that has been executed by a normal privilege user.

At 406, the predetermined exception is received by operating system 422.

At 408, an exception/interrupt vector is accessed by operating system 422 to conduct on-site save operations. For example, conducting on-site save operations includes calculating the post-exception-handling return address and saving status information (e.g., corresponding to user program 420). Subsequent recovery is needed to continue execution at the instruction following the instruction where the exception occurred. Therefore, it is necessary to save status information when the exception occurs and the return address for after exception handling is completed.

At 410, exception handling program 424 corresponding to the predetermined exception is called by operating system 422 in a kernel space.

At 412, data from a secure partition is read and processed by exception handling program 424. Because exception handling program 424 is run in the kernel space, it is possible to successfully read data from the secure partition (which in some embodiments, is stored in the kernel space) and to return it after processing.

At 414, the processed data is returned to operating system 422 from exception handling program 424.

At 416, the processed data is returned to secure user program 420 from operating system 422. Because operating system 422 saves the user program status information and the post-exception-handling return address before carrying out exception handling, it still can result in recovery in secure user program 420 after exception handling is completed.

In some embodiments, step 416 is optionally performed. That is, it is not necessary to return the processed data to secure user program 420 and continue execution. The objective in returning to secure user program 420 is to transfer the processed data to secure user program 420. Alternative to sending the processed data back to secure user program 420, exception handling program 424 can store the processed data in a data file and grant reading permission to the normal privilege user. In this way, it is not necessary to transfer processed data via parameters.

As shown through the steps described above for the example of FIG. 4, all the data obtained by secure user program 420 from the secure partition is processed data. Data security in the secure partition is thus ensured.

As described above, various embodiments use an operating system permission setting to restrict normal privilege users so that they cannot directly read data stored in the secure partition. This in turn also renders user programs that are permitted to be stored by a processor in response to instructions (e.g., exclusively) by normal privilege users unable to directly read data in the secure partition. A particular exception handling program of the operating system is then associated with a predetermined exception. When the user program generates the predetermined exception, the exception handling program corresponding to the predetermined exception is triggered for execution in the kernel space so as to read data in the secure partition and output processed data to the normal privilege user, thereby ensuring the data security of the secure partition. Various embodiments described herein may be implemented using software. Therefore, various embodiments described herein cause almost no increase to product manufacturing cost. It is particularly suitable for low-cost, low-power IoT devices that have few resources.

Furthermore, in some embodiments, access control involving more levels may be established for the secure partition. For example, a three-level access control may be established. The adoption of the above technical scheme means that, in the case of a third-level user, the user can only use a user program to obtain processed data from the secure partition. As for a second-level or first-level user, the operating system permission setting is used so that the second-level user has read permission for only a portion of the data in the secure partition, while the first-level user may read and revise any data in the secure partition. It is thereby possible to meet the security requirements of processing apparatuses in different contexts.

As mentioned above, the secure partition can be designated so that only the highest privilege user can perform write or read operations to the secure partition. When a user program is executed in a corresponding user space, a predetermined exception may be generated that triggers the execution of a corresponding exception handling program in the kernel space. The exception handling program can revise some of the data in the secure partition. (The secure partition can be preset so that a portion of the data is read-only and a portion of the data is readable and writable.) As a result, a highest privilege user can modify data in the secure partition while still being subject to restrictions. This serves to ensure the write security of the secure partition.

To strengthen security management, in some embodiments, a processing apparatus further provides, in addition to the security access control module described above, a debug control management module for analyzing debug commands from a higher-level computer. In various embodiments, debug addresses that are designated according to the debug commands are compared to secure partition addresses, and those commands to debug the secure partition are filtered (e.g., ignored, not performed).

Figure 5:
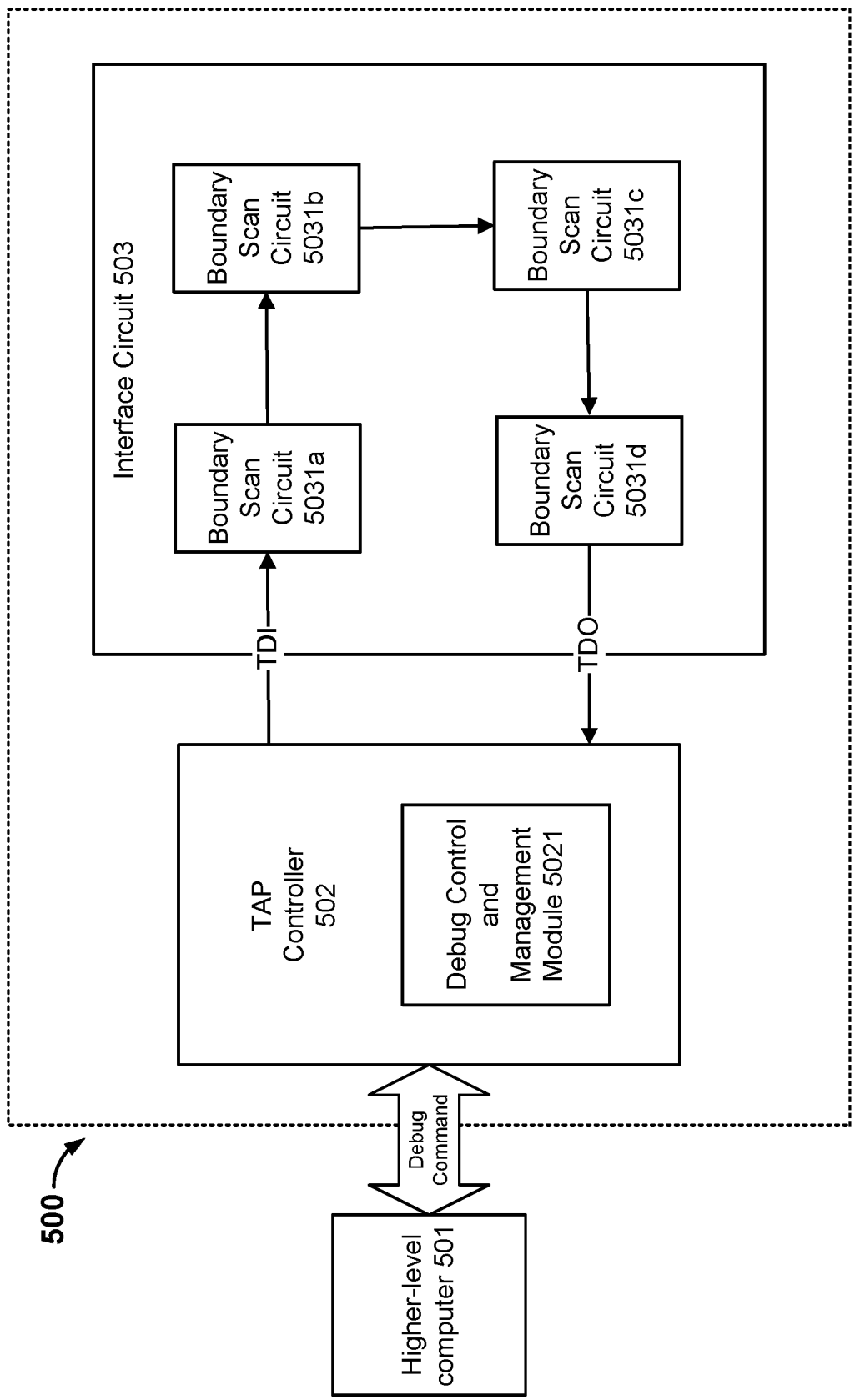
FIG. 5 is a diagram of an example debugging control and management module, a higher-level computer, and a processing apparatus.

FIG. 5 is a diagram of an example debugging control and management module, a higher-level computer, and a processing apparatus. Higher-level computer 501 issues a debug command to TAP controller 502 of processing apparatus 500. TAP controller 502 is responsible for organizing debug commands into JTAG signals and applying them to the corresponding port of interface circuit 503. JTAG signals include TDI, TMI, TDO, and TCK signals. The input ports through which they pass are, correspondingly, TDI, TMI, TDO, and TCK ports. The output port through which they pass is the TDO port. The TDI port is configured to receive input debug commands. The TCK port is configured to receive input test clock signals. The TMS port is configured to receive test method selection signal inputs, and the TDO port is configured to output test result data. Multiple boundary scan components 5031a-d are serially interconnected. After receiving a debug command sent from the TDI port, boundary scan components 5031a-d start to execute, and result data is output from the output interface TDO. TAP controller 502 is responsible for sending output result data back to higher-level computer 501.

In this example, TAP controller 502 also includes debug control and management module 5021, which is configured to monitor and filter debug commands. When a debug command is received from higher-level computer 501, debug control and management module 5021 is configured to check whether the command is a debug command for the secure partition stored on processing apparatus 500. If the command is a debug command for the secure partition, then the debug command is filtered out (e.g., ignored and not performed). If the command is not a debug command for the secure partition, then the debug command undergoes subsequent processing by TAP controller 502. For example, if the debug (e.g., GDB) command is x/32xw 0x40000000, i.e., the command to debug the 0x40000000 debug address, and the security partition is also located at 0x40000000, debug control and management module 5021 will filter out all debug commands for this address. The debug address designated by the debug command may be a virtual address in memory (associated with a physical address by a memory management unit). The debug address designated by the debug command can also be a physical address in memory. If it is known that the parameter transmitted by debug control and management module 5021 is a virtual address, but that the secure partition uses a physical address to designate the access address, the virtual address can be translated into a physical address based on the translation table, or the access address can be translated into a virtual address.

Please note that TAP controller 502, like interface circuit 503, is located on processing apparatus 500. For example, both TAP controller 502 and interface circuit 503 are located on a printed circuit (if there is one). Or they may be located outside of processing apparatus 400 on, for example, an external test device. TAP controller 502 is essentially set up in order to conduct circuit testing. Therefore, it might or might not be removed from the device after the product is shipped from the factory.

In some embodiments, the control program of debug control and management module 5021 may be burned into the ROM. This control program can read a one-identifier bit in the secure partition of the processing apparatus and, on the basis of the identifier bit, decide whether to perform debug control (e.g., the controlling of filtering out debug commands targeting the secure partition). Specifically, if no identifier bit has been set, the control function of debug control and management module 5021 will not start. The control function of debug control and management module 5021 starts only when the identifier bit is set. The setting of the identifier bit can be executed by debug control and management module 5021 or by the security access management module.

By combining the use of the security access management module and the debug control module as described herein, in most situations, the data security of data stored in the secure partition can be ensured.

The methods described above can be applied to any processor architecture and applied to flash chips, processors (CPUs), digital processors (DSPs), systems on a chip, processing units manufactured for various specialized objectives, and various electronic formed on the basis of the above, e.g., smart phones, smart speakers, television sets, set-top boxes, players, firewalls, routers, notebook computers, tablet computers, PDAs, IoT (Internet of Things) products, and other terminals that merge combinations of these functions.

The aforementioned processing units, processing systems, or electronic devices can be implemented with hardware, special-purpose electronic circuits, software, logic, or any combination thereof. To give an example, some aspects may be realized in hardware, while other aspects are realized in firmware or software executable by a controller, microprocessor, or other computing device, although the present invention is not limited to these. Although each aspect of the present invention may be explained and described in the form of block charts or flowcharts or by other graphic representations, it is clear that these blocks, apparatuses, systems, techniques, or methods described in the text can be realized through the following non-restrictive examples: hardware, software, firmware, special-purpose circuits or logic, general-purpose hardware or controllers, other computing devices, or combinations thereof. One may implement circuit designs of the present invention in each component, such as an integrated circuit module, if it is relevant.

The above are merely preferred embodiments of the present invention and are not for the purpose of restricting the present invention. For a person skilled in the art, there may be various modifications and variations of the present invention. Any modification, equivalent substitution, or improvement made in the spirit and principles of the present invention shall be included within the protective scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
associating a predetermined exception with an exception handling program in an operating system having at least two types of users, wherein the at least two types of users comprising the normal privilege user and the highest privilege user;
restricting a user program to execution by the normal privilege user, wherein a highest privilege user is not permitted to execute the user program; and
designating a secure partition of an address space of memory and restricting the secure partition to be accessible by a highest privilege user;
wherein:
in response to the user program causing a type of exception handling to be executed for which a result is a reading, processing, or exporting data stored in the secure partition when the user program is executed in a user space corresponding to the normal privilege user, the user program generates the predetermined exception, wherein the exception handling program processes the data read from the secure partition before returning data from the secure partition to the normal privilege user;
the predetermined exception triggers execution of the exception handling program in a kernel space;
the exception handling program executing in the kernel space is configured to read data from the secure partition, obtain post-processed data by processing the data read from the secure partition to cause the user program to be unable to read or access portions of the data for which the user program does not have requisite permissions, and deliver the post-processed data to the user program;
the user program is stored in a user space of the address space; and
a normal privilege user permission set is more restrictive with respect to the secure partition than a highest privilege user permission set.

2. The method of claim 1, wherein the user program is configured to generate the predetermined exception by invoking a system service program.

3. The method of claim 2, wherein the system service program is configured to generate the predetermined exception in response to performing a write operation on a read-only storage area.

4. The method of claim 3, wherein the system service program is configured to generate the predetermined exception in response to an access to a read-only storage area that is restricted to be accessible by the highest privilege user.

5. The method of claim 3, wherein the read-only storage area is the secure partition.

6. The method of claim 4, wherein the read-only storage area is the secure partition.

7. The method of claim 1, wherein the associating the predetermined exception with the exception handling program in the operating system comprises:

copying the exception handling program into an exception/interrupt vector of the operating system during the boot-up of the operating system.

8. The method of claim 7, wherein the predetermined exception triggers execution of the exception handling program in the kernel space comprises:
in the kernel space, the operating system being configured to respond to the predetermined exception, obtain return address after processing the predetermined exception, save status information, and execute the exception handling program based on the predetermined exception.

9. The method of claim 8, further comprising:
returning to the user program according to the return address.

10. The method of claim 1, wherein the exception handling program is configured to write the data after processing the data into a data file and grant the normal privilege user read permission to the data file.

11. The method of claim 1, further comprising:
receiving a debug command;
comparing a debug address designated by the debug command and an access address associated with the secure partition; and
filtering out the debug command if the debug address matches the access address.

12. The method of claim 11, further comprising: if either the debug address or the access address is a virtual address and the other is a physical address, converting both to either virtual addresses or physical addresses based on a translation table.

13. The method of claim 10, further comprising: configuring an identifier bit, wherein the identifier bit represents whether to perform debugging control.

14. The method of claim 13, wherein the identifier bit is stored in the secure partition.

15. A system, comprising:
a processor for executing instructions, the instructions coming from an operating system, a secure access management module, an exception handling program, and a user program;
a storage device linked to the processor;
wherein:
at least a portion of storage space of the storage device is partitioned into kernel space and user space;
multiple instructions of the operating system and the secure access management module are executed by the processor in kernel space;
multiple instructions of the user program are executed by the processor in the user space;
the user program is stored in the user space;
the operating system is configured to associate a predetermined exception with the exception handling program;
the security access management module is configured to designate a secure partition comprised in the kernel space, and restrict the secure partition to be accessible by a highest privilege user and restrict the user program to be executable by a normal privilege user, wherein the highest privilege user is not permitted to execute the user program;
a normal privilege user permission set is more restrictive with respect to the secure partition than a highest privilege user permission set;
in response to the user program causing a type of exception handling to be executed for which a result is a reading, processing, or exporting data stored in the secure partition when the user program executed in a user space corresponding to the normal privilege user, the user program is configured to generate the predetermined exception, wherein the exception handling program processes the data read from the secure partition before returning data from the secure partition to the normal privilege user;
the predetermined exception is configured to trigger execution of the exception handling program in the kernel space; and
the exception handling program executing in the kernel space is configured to read data from the secure partition, obtain post-processed data by processing the data read from the secure partition to cause the user program to be unable to read or access portions of the data for which the user program does not have requisite permissions, and deliver the post-processed data to the user program.

16. The system of claim 15, wherein the user program is configured to generate the predetermined exception by invoking a system service program.

17. The system of claim 16, wherein the system service program is configured to generate the predetermined exception when performing a write operation on a read-only storage area.

18. The system of claim 16, wherein the system service program is configured to generate the predetermined exception in response to an access to a read-only storage area that is restricted to be accessible by the highest privilege user.

19. The system of claim 17, wherein the read-only storage area is the secure partition.

20. The system of claim 18, wherein the read-only storage area is the secure partition.

21. The system of claim 15, wherein it further comprises: a debug control and management module that is configured to compare a debug address designated by a received debug command to an access address associated with the secure partition and filter out the received debug command if the debug address matches the access address.

22. The system of claim 21, further comprising: a identifier bit setting unit configured to configure a identifier bit, wherein the identifier bit represents whether to perform debugging control.

23. The system of claim 22, wherein the identifier bit is stored in the secure partition.

24. A non-transitory computer-readable medium, comprising multiple instructions, the multiple instructions forming an operating system, a user program, and an exception handling program;
the instructions of the operating system, user program, and exception handling program implement the following operations when executed by a processor:
associating a predetermined exception with the exception handling program in the operating system having at least two types of users, wherein the at least two types of users comprising the normal privilege user and the highest privilege user;
restricting a user program to execution by the normal privilege user, wherein a highest privilege user is not permitted to execute the user program; and
designating a secure partition of an address space of memory and restricting the secure partition to be accessible by a highest privilege user;
wherein:
in response to the user program causing a type of exception handling to be executed for which a result is a reading, processing, or exporting data stored in the secure partition when the user program is executed in a user space corresponding to the normal privilege user, the user program generates the predetermined exception, wherein the exception handling program processes the data read from the secure partition before returning data from the secure partition to the normal privilege user;

the predetermined exception triggers execution of the exception handling program in a kernel space; the exception handling program executing in the kernel space is configured to read data from the secure partition, obtain post-processed data by processing the data read from the secure partition to cause the user program to be unable to read or access portions of the data for which the user program does not have requisite permissions, and deliver the post-processed data to the user program;

the user program is stored in a user space of the address space; and a normal privilege user permission set is more restrictive with respect to the secure partition than a highest privilege user permission set.

25. The system of claim 1, wherein obtaining post-processed data by processing the data read from the secure partition to cause the user program to be unable to read or access portions of the data for which the user program does not have requisite permissions comprises:

determining a portion of the data read from the secure partition for which the user program does not have requisite permissions; and using a process running in the kernel space to remove the portion of data read from the secure partition before providing the data read from the secure partition to a process outside the kernel space.

26. The system of claim 1, wherein obtaining post-processed data by processing the data read from the secure partition to cause the user program to be unable to read or access portions of the data for which the user program does not have requisite permissions comprises:

determining a portion of the data read from the secure partition for which the user program does not have requisite permissions; and using a process running in the kernel space to encrypt the portion of data read from the secure partition before providing the data read from the secure partition to a process outside the kernel space.

* * * * *